United States Patent
Westerling et al.

(10) Patent No.: US 7,165,449 B2
(45) Date of Patent: Jan. 23, 2007

(54) SLOT ANTENNA

(75) Inventors: Jan Westerling, Linkoping (SE); Torbjörn Krig, Österbymo (SE)

(73) Assignee: SAAB Rosemount Tank Radar AB, Gothenburg (SE)

( * ) Notice: Subject to any disclaimer, the term of this patent is extended or adjusted under 35 U.S.C. 154(b) by 0 days.

(21) Appl. No.: 10/495,412

(22) PCT Filed: Nov. 14, 2002

(86) PCT No.: PCT/SE02/02081

§ 371 (c)(1),
(2), (4) Date: Dec. 21, 2004

(87) PCT Pub. No.: WO03/042639

PCT Pub. Date: May 22, 2003

(65) Prior Publication Data

US 2005/0099349 A1    May 12, 2005

(30) Foreign Application Priority Data

Nov. 16, 2001   (SE) ................................. 0103816-5

(51) Int. Cl.
*G01F 23/00* (2006.01)
*H01Q 13/00* (2006.01)

(52) U.S. Cl. .................................... 73/290 V; 343/780
(58) Field of Classification Search ................ 343/853, 343/855, 904, 905, 906, 907, 908, 911 R, 343/700 MS, 767, 769, 771–773, 780; 73/290 R, 73/290 V
See application file for complete search history.

(56) References Cited

U.S. PATENT DOCUMENTS (Continued)

FOREIGN PATENT DOCUMENTS

EP   1 083 413 B1   4/2003

(Continued)

OTHER PUBLICATIONS

"Experimental Investigations into a Linearly Polarized Radial Slot Antenna for DBS TV in Austria", by P. Davis et al., IEEE Transactions on Antennas and Propagation, vol. 45, No. 7, Jul. 1997, pp. 1123-1129.

*Primary Examiner*—Hoang V. Nguyen
*Assistant Examiner*—Minh Dieu A
(74) *Attorney, Agent, or Firm*—Westman, Champlin & Kelly, P.A.

(57) ABSTRACT

An antenna in a radar level gauge for determining the level of the surface of a medium stored in a tank. The antenna has a first and a second electrically conductive layer, and between the conductive layers a dielectric layer. The second of the conductive layers is provided with a number of holes in a predetermined pattern. Leading to the center of the dielectric layer is a transmission line. The microwaves from a radar unit in the radar level gauge are supplied to the dielectric layer in the antenna via the transmission line and transmitted out in a radial direction from a feed point in the dielectric layer that acts as a waveguide. Via said holes in the second conductive layer a microwave beam radiates out. Due to matching of the phase of the microwave and the placing of the individual holes in the pattern that the holes form, a predominant waveguide mode of the desired order is obtained.

21 Claims, 2 Drawing Sheets

U.S. PATENT DOCUMENTS 3,701,158 A * 10/1972 Johnson ....................... 343/725
4,641,139 A     2/1987 Edvardsson ................. 342/124
6,266,022 B1    7/2001 Muller et al. ................ 343/703
6,325,391 B1 * 12/2001 Smith et al. ................. 277/650
6,404,401 B1 *  6/2002 Gilbert et al. ............... 343/780
6,606,904 B1 *  8/2003 Muller et al. ............. 73/290 V
2003/0085844 A1 * 5/2003 Olson et al. ................ 343/749

FOREIGN PATENT DOCUMENTS

JP           4207703 A     7/1992

* cited by examiner

// SLOT ANTENNA

CROSS-REFERENCE TO RELATED APPLICATION

This Application is a Section 371 National Stage Application of International Application No. PCT/SE02/02081, filed Nov. 14, 2002 and published as WO 03/042639 on May 22, 2003, in English.

FIELD OF THE INVENTION

The present invention relates to an antenna for use in a level gauge that utilizes a radar for determining the level of the surface of a medium stored in a tank, the invention presenting both a device and a method for causing a predominant and predetermined microwave mode to be transmitted from the antenna.

BACKGROUND OF THE INVENTION

It is known to measure the level of the surface of a medium stored in a tank by using radar level gauges. Examples of such a device are given in U.S. Pat. No. 4,641,139. In a device of the type described in said patent specification, a tube that communicates with the medium in the tank is used as a waveguide for the microwaves that are transmitted by a radar unit and are received by the same radar unit following reflection from the surface of the medium in the tube.

Tubes that are used as waveguides in level measurement are usually circular and have a diameter that is at least twice as great as the wavelength of the microwaves that are used in the radar unit. When microwaves are transmitted in a tube with the given conditions, a plurality of different modes of microwaves is transmitted in the tube waveguide. To obtain the only desired microwave mode, a mode generator that comprises a waveguide is used in this case for generating a microwave mode of a higher order and in addition a long, cone-shaped antenna as a transition stage from the narrower waveguide to the wider tube in the tank for transmitting the desired mode in the tube waveguide.

The present invention presents an alternative design of an antenna, in which the design of the antenna renders a separate mode generator superfluous.

A known antenna structure for achieving a waveguide mode by means of a flat antenna is presented in patent specification EP 1 083 413.

SUMMARY OF THE INVENTION

According to one aspect of the invention, an antenna is presented for a radar level gauge for determining the level of the surface of a medium that is stored in a tank. A tube with a diameter that is at least twice as great as the wavelength of the microwaves that are transmitted is used as a waveguide Inside the tank. The antenna has a first and a second electrically conductive layer, and between the conductive layers a dielectric layer. The second of the conductive layers is provided with a number of holes in a predetermined pattern. A transmission line leads to the dielectric layer. The microwaves from a radar unit in the radar level gauge are supplied to the dielectric layer in the antenna via the transmission line and transmitted out in a radial direction from a feed point in the dielectric layer that acts as a waveguide. Via said holes in the second conductive layer, a microwave beam radiates out into the space that surrounds said second conductive layer. Due to matching between the phase of the microwave and the placing of the individual holes in a pattern formed by the holes, a predominant waveguide mode of the desired order is obtained.

According to a second aspect of the invention, a method is presented for achieving a desired and pure waveguide mode according to the independent method claim.

In the measurements carried out by means of the device and method respectively according to the invention, the desired predominant mode is an $H_{01}$ mode.

The feeding of a microwave signal to the dielectric layer preferably takes place at the centre of this layer, when the layers in the antenna are circular in form. The microwave beam radiated is fixed preferably to radiate out orthogonally to the layers of the antenna. By adjusting the pattern of holes, other angles between the beam radiated and the antenna layers can be achieved.

One advantage of an antenna according to the aspects of the invention is that the device Is simpler than according to the previously known method for producing the desired waveguide mode. Another advantage is that a mode generator intended for the purpose for achieving a predominant mode is not required.

In the known device according to EP 1 083 413, the antenna function has more parts than in the invention presented, including more dielectric layers. In the device according to the invention, no feed network is used to which the microwave signal is supplied, such as is the case with the antenna according to said patent. One dielectric layer is used instead as a supply medium for the microwave signal, where the dielectric layer feeds the signal radially outwards from the centre of the dielectric layer, the actual holes or slots in the second conductive layer acting as antenna elements. Furthermore, the antenna can be made more robust, since the conductive planes, in the form of the conductive layers, are not so demanding with regard to tolerances. They can be cut out of metal layers or etched out of printed circuit board laminate.

DETAILED DESCRIPTION OF THE PREFERRED EMBODIMENTS

An example of an embodiment is described here with reference to enclosed figures.

Figure 1:
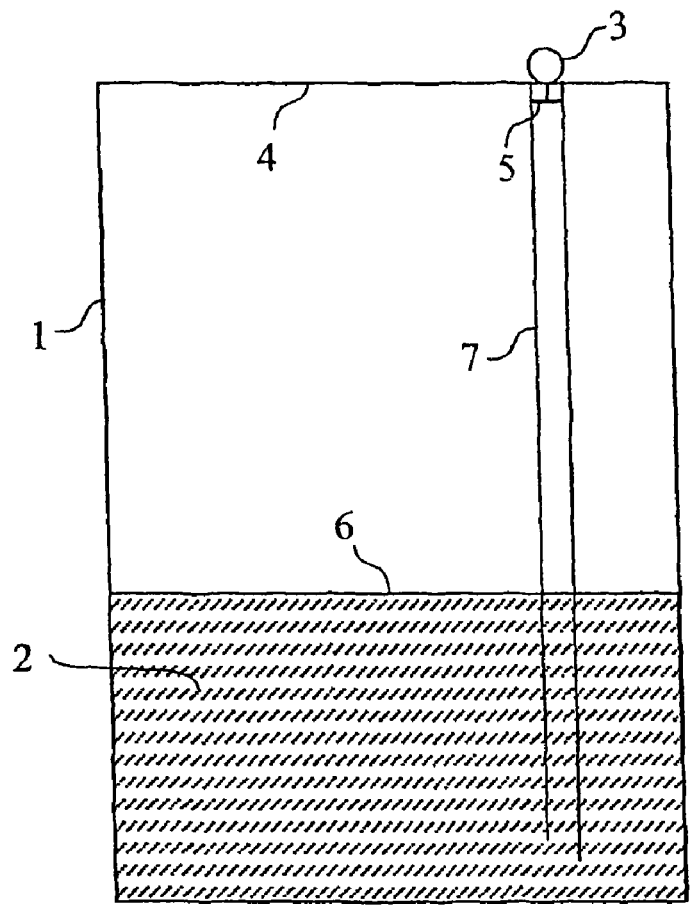
FIG. 1 shows diagrammatically a radar level gauge in a tank for determining the level of the surface of a medium stored in a tank.
Figure 3:
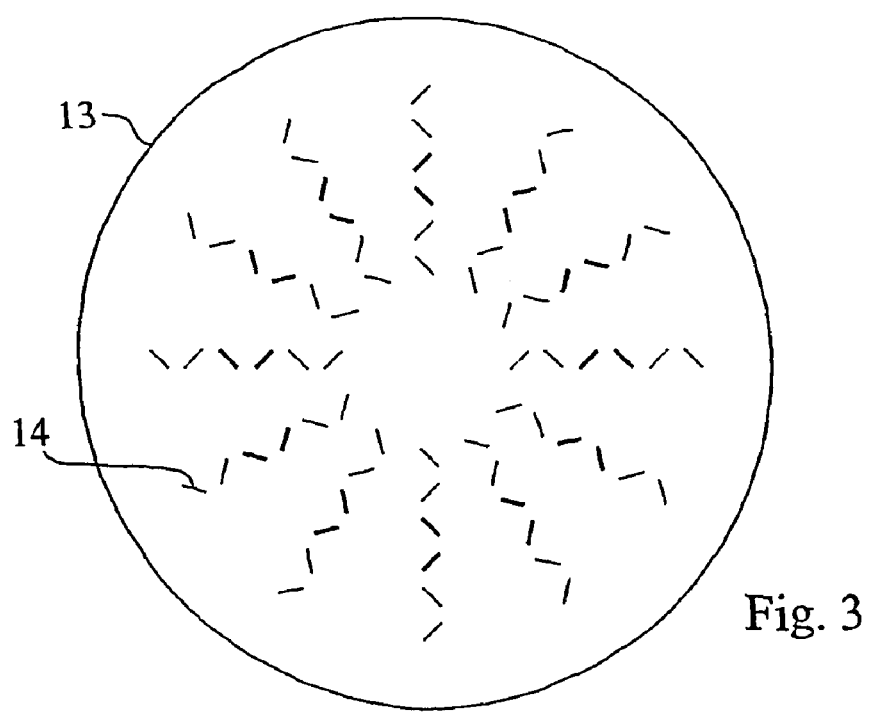
FIG. 3 shows an example of a slot pattern for achieving a predetermined microwave mode from the antenna.

The principle of a radar level gauge is shown in FIG. 1. A tank 1 is used for storage of a medium 2. The medium can be a liquid, such as oil, refined products and gas in liquid form, or can consist of a particulate material, i.e. a powdered solid substance. A radar 3 is fitted to the top 4 of the tank 1, from which a microwave beam is transmitted from and received by the radar via an antenna 5 on the inside of the tank. The beam transmitted is reflected from the surface 6 of the medium and picked up by the antenna 5. Through comparison and evaluation in a calculation and control unit of the time delay when using microwaves between a transmitted and reflected signal characteristic, the level of the surface 6 of the medium is determined in a known manner. The figure also shows that the microwaves are transmitted via a tube-shaped waveguide 7 that communicates with the medium, which in this case is a liquid, through openings (not shown) in the wall of the waveguide.

Figure 2:
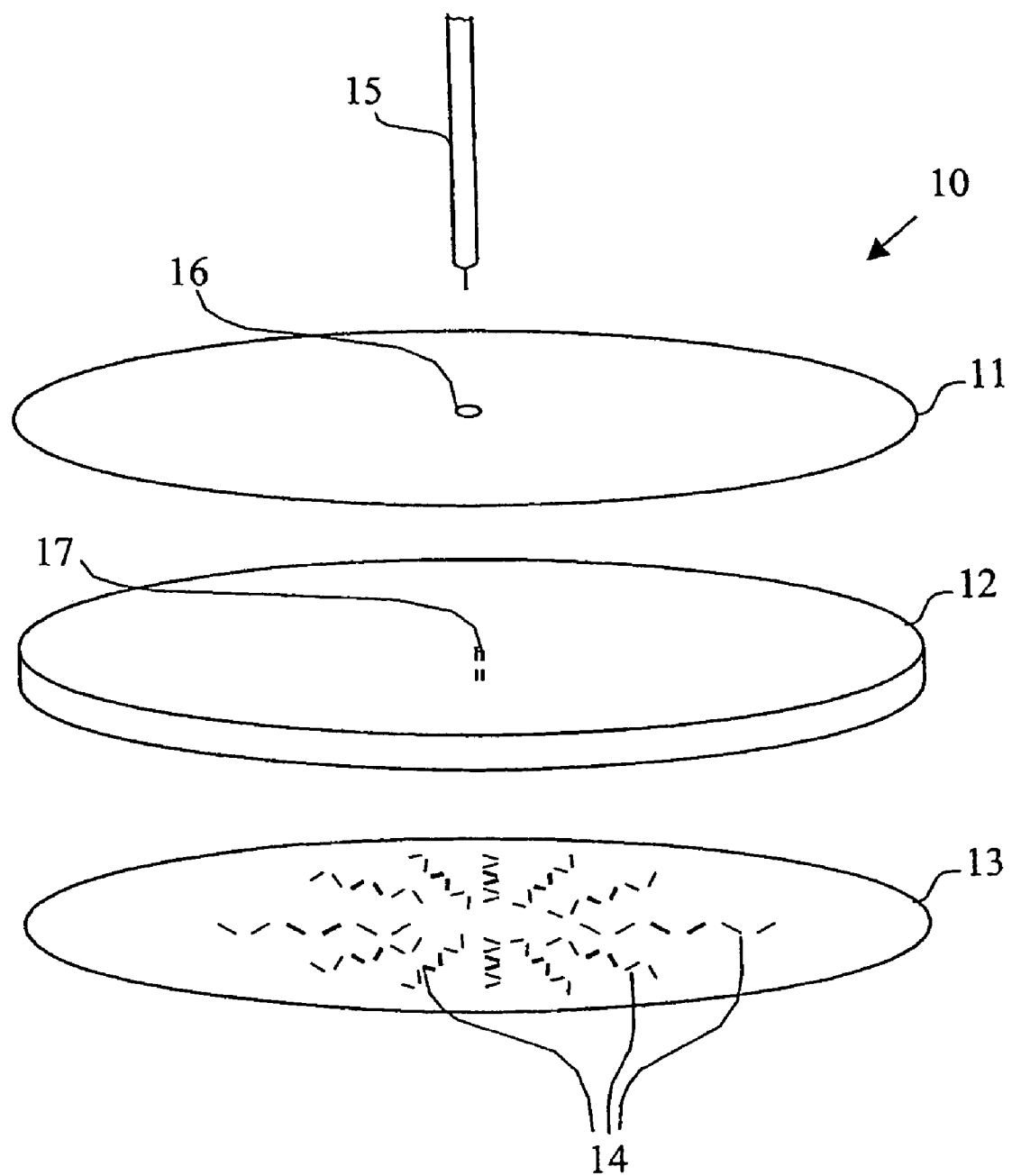
FIG. 2 shows diagrammatically the different layers that together build up the antenna according to the aspects of the invention.

The construction of an antenna 10 according to the invention is shown in FIG. 2. The antenna is intended to transmit and receive a microwave signal in a radar level gauge according to the above. In the figure, a first electrically conductive layer 11 is illustrated. Thus the first conductive layer 11 can be formed of a metal layer, for example a thin copper plate. A dielectric layer 12 is applied next to the first conductive layer 11 and adjoining this. The dielectric layer has a thickness that is determined by the frequency and propagation velocity of the microwave signal. The thickness shall thus be less than half the wavelength for the selected frequency. The material in the dielectric layer can be teflon, but can also consist of any dielectric that has sufficiently low losses and withstands the environment in the space where the antenna is placed, such as e.g. the temperature in the space. The next layer in the antenna 10 consists of a second conductive electrical layer 13, which adjoins the other side of the dielectric layer 12, i.e. the side of said dielectric layer that faces away from the first electrically conductive layer 11. This second electrically conductive layer is also best executed as a metal layer of copper or another conductive substance. A number of holes has been punched or cut out in this second electrically conductive layer 13. In the example shown, these holes consist of oblong slots 14 that are executed in a certain pattern. In the example shown, all layers are shown as circular layers, since the antenna in the example is used for transmitting and receiving microwaves in a circular waveguide. The appearance of the pattern is determined by the field image that it is intended to achieve. The theory for calculating antenna parameters, such as the position of the slots and the slot geometry in the desired microwave mode is indicated in the article: IEEE Trans. on Antennas and Propagation, Vol. AP-45, No. 7, July 1997, P. W. Davis & M. E. Bialkowski. The antennas described therein are intended for a normal antenna function, i.e. generally parabolic-type antennas. In the present case, generation of a predominant waveguide mode is already taken into account in the antenna, the pattern being calculated for this purpose.

The first 11 and second conductive layer 13 are advantageously earthed to prevent electrostatic charging of the layers. Earthing can be achieved via connection of the first layer to an earthed envelope of the transmission line. Earthing of the second layer is effected for example by a conductive connection at the periphery of the layers between the first and second conductive layer. An alternative is for both conductive layers 11, 13 to be connected to surrounding conductive material, such as e.g. the tube waveguide 7 in which the antenna 10 is fastened.

The antenna Is supplied with a microwave signal from the radar unit of the radar level gauge 3 via a transmission line 15. The first conductive layer 11 is provided with a lead-through 16 in the form of an opening made in the layer. The signal-carrying part of the transmission line 15 is designed to be led in via the lead-through 16 and terminated in a cavity that is formed centrally in the dielectric layer 12. The cavity can be a recess that matches in size and receives e.g. the signal-carrying third wire in a coaxial cable that serves as a transmission line. Due to this arrangement and the fact that the dielectric layer is located between two electrically conductive layers, the microwave signal will be propagated radially outwards from the cavity 17 to the periphery of the dielectric layer 12 like a wave motion, in which the dielectric layer acts as a waveguide. An absorbent layer can be applied at the periphery of the dielectric layer to obtain better performance. The absorbent layer is formed here as a ring or edge that encloses the dielectric layer 12 along its periphery and is located between the two electrically conductive layers 11, 13.

As already said, the second electrically conductive layer 13 is provided with a number of slots 14. The wave motion in the form of the microwave signal that is propagated in the dielectric layer 12 will leak out through the holes that the slots form in the second conductive layer 13, in which case the microwave energy will radiate out from said second conductive layer 13, the device acting like an antenna. By adapting the positions of the slots 14 to the microwave signal used, the desired microwave mode can be made to be generated. This occurs when the frequency of the microwave signal and its phase interact constructively with the position of the slots 14 in the second conductive layer 13. Due to constructive interference between the wave parts leaking from respective slots, these are assembled to form a desired microwave mode. The theoretical calculations behind this represent the prior art and are not described here. The microwave mode that is desirable here is the $H_{01}$, mode (alternative description $TE_{01}$), since this mode is well suited to level measurement in said tube that is used as a waveguide in the tank 1. Said mode is suitable for use in the type of measurement envisaged, since it gives low attenuation in the intended tube waveguide 7 even when the tube waveguide is rusty or fouled. Other modes of the microwave signal only occur to a low degree, attenuation of such modes not needing to be undertaken when using the antenna structure described. The slot pattern that is shown in FIG. 2 is a specific pattern linked to a certain waveguide mode, in the example shown for generating the $H_{01}$ mode.

If the antenna 10 is placed across the tube waveguide 7, i.e. at right angles to the tube, the microwave beam transmitted is disposed to be orthogonal to the antenna surface, i.e. to the plane of the conductive layers. If on the other hand it is desired that the antenna 10 is sloping in relation to the horizontal plane, the pattern of slots is executed in such a way that the microwave energy radiated from the respective slot through constructive interference creates a microwave beam that is angled diagonally to the antenna surface.

The invention claimed is:

1. Antenna for a radar in a level gauge that is used to determine the level of the surface of a medium in a tank, characterized in that it comprises:
   a first and a second electrically conductive layer,
   a dielectric layer between the conductive layers,
   a number of holes executed in a predetermined pattern in the second conductive layer and
   a transmission line set up to the dielectric layer via a connection, wherein microwaves from the radar are supplied to the dielectric layer via the transmission line's connection and are distributed out radially in the dielectric layer from the connection and from the dielectric layer radiate out with a predetermined predominant microwave mode via the holes in the second conductive layer; and
   wherein the respective holes in the pattern and the geometry of the holes are based on predetermined microwave mode as well as the microwave's frequency and phase position at respective holes.

2. Antenna according to claim 1, in which the microwaves are fed to the dielectric layer via a connection arranged centrally in the layer.

3. Antenna according to claim 1, in which the first layer is executed with a lead-through for the transmission line for supplying a microwave signal to the dielectric layer.

4. Antenna according to claim 1, in which a cavity is formed in the dielectric layer for receiving the feeding part of the transmission line for transmitting microwaves out into the surrounding dielectric layer.

5. Antenna according to claim 1 in which the holes have been placed in such a pattern that the microwave mode transmitted will be an $H_{01}$ Mode.

6. Antenna according to claim 5, in which the pattern comprises a number of holes executed as slots, which are arranged in zigzag lines of slots, wherein the zigzag lines lie along radii that start out from a point by the feed point of the transmission line.

7. Antenna according to claim 1, in which at least one of the conductive layers is earthed.

8. Antenna according to claim 1, in which the antenna transmits and receives a microwave signal reflected by the surface via a tube, which is used as a waveguide for the microwaves that are transmitted and received respectively by the radar.

9. Antenna according to claim 1, in which the antenna transmits and receives a microwave signal reflected by the surface via a tube, which is used as a waveguide for the microwaves that are transmitted and received respectively by the radar and in which the tube has a diameter that is at least twice as great as the wavelength of the microwaves.

10. Antenna according to claim 1, in which the thickness of the dielectric layer is less than half the wavelength of the microwave that is transmitted via the antenna.

11. Method for generating a predominant microwave mode for transmission of said mode from an antenna in a level gauge, in which a radar is used to determine the level of the surface of a medium in a tank, in which the method comprises the stages:

a microwave signal is transmitted from the radar via a transmission line to a dielectric layer, a first and a second electrically conductive layer are arranged on each side of and adjacent the dielectric layer, the microwave signal is transmitted radially outwards from the transmission line in the dielectric layer that serves as a waveguide, in the second of the electrically conductive layers the microwave signal is permitted to pass a number of holes that form a predetermined pattern and by adapting the hole pattern to the frequency and phase of the microwave signal, the predominant microwave mode is obtained, which radiates out via the holes in the second conductive layer.

12. Antenna for a radar in a level gauge that is used to determine the level of the surface of a medium in a tank, characterized in that it comprises:

a first and a second electrically conductive layer, a dielectric layer between the conductive layers, a number of holes executed in a predetermined pattern in the second conductive layer;

a transmission line set up to the dielectric layer via a connection, wherein microwaves from the radar are supplied to the dielectric layer via the transmission line's connection and are distributed out radially in the dielectric layer from the connection and from the dielectric layer radiate out with a predetermined predominant microwave mode via the holes in the second conductive layer;

wherein the respective holes in the pattern and the geometry of the holes are based on predetermined microwave mode as well as the microwave's frequency and phase position at respective holes; and wherein the antenna transmits and receives a microwave signal reflected by the surface via a tube, which is used as a waveguide for the microwaves that are transmitted and received respectively by the radar.

13. Antenna according to claim 12, in which the positions of the respective holes in the pattern and the geometry of the holes are based on predetermined microwave mode as well as the microwave's frequency and phase position at respective holes.

14. Antenna according to claim 12, in which the microwaves are fed to the dielectric layer via a connection arranged centrally in the layer.

15. Antenna according to claim 12, in which the first layer is executed with a lead-through for the transmission line for supplying a microwave signal to the dielectric layer.

16. Antenna according to claim 12, in which a cavity is formed in the dielectric layer for receiving the feeding part of the transmission line for transmitting microwaves out into the surrounding dielectric layer.

17. Antenna according to claim 12, in which the holes have been placed in such a pattern that the microwave mode transmitted will be an $H_{01}$ Mode.

18. Antenna according to claim 17, in which the pattern comprises a number of holes executed as slots, which are arranged in zigzag lines of slots, wherein the zigzag lines lie along radii that start out from a point by the feed point of the transmission line.

19. Antenna according to claim 12, in which at least one of the conductive layers is earthed.

20. Antenna according to claim 12, in which the antenna transmits and receives a microwave signal reflected by the surface via a tube, which is used as a waveguide for the microwaves that are transmitted and received respectively by the radar and in which the tube has a diameter that is at least twice as great as the wavelength of the microwaves.

21. Antenna according to claim 12, in which the thickness of the dielectric layer is less than half the wavelength of the microwave that is transmitted via the antenna.

* * * * *